US012553589B1

(12) United States Patent
Chiang et al.

(10) Patent No.: US 12,553,589 B1
(45) Date of Patent: Feb. 17, 2026

(54) SHADING APPARATUS

(71) Applicant: BENQ CORPORATION, Taipei (TW)

(72) Inventors: Chin-Fu Chiang, New Taipei (TW);
Chun-Jung Chen, Taipei (TW);
Yung-Yeh Chang, Taipei (TW)

(73) Assignees: BenQ Intelligent Technology (Shanghai) CO., LTD, Shanghai (CN);
BenQ Corporation, Taipei (TW)

( * ) Notice: Subject to any disclaimer, the term of this patent is extended or adjusted under 35 U.S.C. 154(b) by 0 days.

(21) Appl. No.: 19/069,249

(22) Filed: Mar. 4, 2025

(30) Foreign Application Priority Data

Sep. 20, 2024 (TW) .................................. 113135789

(51) Int. Cl.
*F21V 1/12* (2006.01)
*F21V 17/10* (2006.01)
*F21V 21/30* (2006.01)
*F21V 33/00* (2006.01)
*G02B 27/00* (2006.01)

(52) U.S. Cl.
CPC .............. *F21V 1/12* (2013.01); *F21V 17/105* (2013.01); *F21V 21/30* (2013.01); *G02B 27/00* (2013.01); *F21V 33/0056* (2013.01)

(58) Field of Classification Search
CPC .......... F21V 1/12; F21V 17/105; F21V 21/30; F21V 33/0004; F21V 33/0024; F21V 33/0048; F21V 33/0044; F21V 33/0056; F21V 33/008; H04N 5/72; G02B 27/00

USPC ................................. 362/257, 253, 398, 234
See application file for complete search history.

(56) References Cited

U.S. PATENT DOCUMENTS

| 5,121,253 | A | * | 6/1992 | Waintroob | ............ | G06F 1/1603 348/E5.131 |
| 5,243,463 | A | * | 9/1993 | Waintroob | ............... | H04N 5/65 348/E5.131 |
| 2012/0039074 | A1 | | 2/2012 | Glowinski | | |

FOREIGN PATENT DOCUMENTS

CN 208092588 U 11/2018

* cited by examiner

*Primary Examiner* — Laura K Tso

(57) ABSTRACT

A shading apparatus with an illumination function is applied to a display panel. The shading apparatus includes a shelter and a color assessment light module. The shelter is disposed on the display panel, and includes a top member, a first lateral member, a second lateral member and a first assembling component. The top member is disposed on an upper side of the display panel. The second lateral member is relative to the first lateral member. The first assembling component is disposed on the top member. The color assessment light module is disposed on the shelter, and includes a supporting component, a second assembling component and an illumination holder. The supporting component includes an accommodating portion, a connecting portion and a positioning portion. The second assembling component is detachably disposed on the accommodating portion and assembled with the first assembling component. The illumination holder is rotatably disposed on the connecting portion.

15 Claims, 7 Drawing Sheets

SHADING APPARATUS

BACKGROUND OF THE INVENTION

1. Field of the Invention

The present invention relates to a shading apparatus, and more particularly, to a shading apparatus with an illumination function.

2. Description of the Prior Art

With the advanced technology, the user is increasingly concerned about the audio-visual experience of the entertainment device. Taking the gaming display as an example, the hardware and software configurations of the gaming display are designed with high contrast, high sharpness, and functions that can automatically adjust the display brightness according to the ambient light. However, even if the display brightness can be adjusted due to changes in the ambient light, the displaying effect of the gaming display is still affected by the ambient light, which results in the low image quality. The conventional solution is to install a shelter outside the display to directly block the ambient light; when using the display with the shelter, the user is usually in the dark room without the ambient light, or an area in front of the display is blocked by the shelter from the ambient light. If the user wants to check color of some object at this time, the user must move away from the shelter of the display to see the object clearly, which is extremely inconvenient. Therefore, design of a shelter with an illumination function is an important issue in the related mechanical design industry.

SUMMARY OF THE INVENTION

The present invention provides a shading apparatus with an illumination function for solving above drawbacks.

According to the claimed invention, a shading apparatus with an illumination function is applied to a display panel. The shading apparatus includes a shelter and a color assessment light module. The shelter is disposed on the display panel, and includes a top member, a first lateral member, a second lateral member and a first assembling component. The top member is disposed on an upper side of the display panel, and has a first side and a second side opposite to each other. The first lateral member is disposed on the first side. The second lateral member is disposed on the second side and opposite to the first lateral member. The first assembling component is disposed on the top member. The color assessment light module is disposed on the shelter, and includes a supporting component, a second assembling component and an illumination holder. The supporting component includes an accommodating portion, a connecting portion and a positioning portion. The positioning portion is extended from the accommodating portion outwardly to position on the top member. The second assembling component is disposed on the accommodating portion and detachably assembled with the first assembling component. The illumination holder is rotatably disposed on the connecting portion.

The shading apparatus of the present invention can assemble the top member, the first lateral member and the second lateral member together at any angle to form the shelter. The opening can be optionally formed on the shelter for accommodating a color calibrator, and the hole region may be formed on the top member in accordance with arrangement of the color assessment light module. The color assessment light module can be disposed outside the shelter, and the illumination holder can be inserted into the shelter through the hole region of the top member; or, the color assessment light module may be directly disposed inside the shelter. Therefore, the present invention can assemble the shelter with the color assessment light module to form the shading apparatus, which can save a lot of placement space; the color assessment light module can be disposed outside or inside the shelter without affecting the appearance and function of the shading apparatus. When there is no color matching operation to be performed, the color assessment light module can be turned off, and the ambient light can be effectively blocked by the shelter; when the color matching operation is required, the brightness inside the shelter is insufficient, and the user can just turn on the color assessment light module of the shading apparatus, instead of leaving the display panel to turn on the external illumination apparatus or removing the shading apparatus, and can check color of the target object or read the document within the range of the shelter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
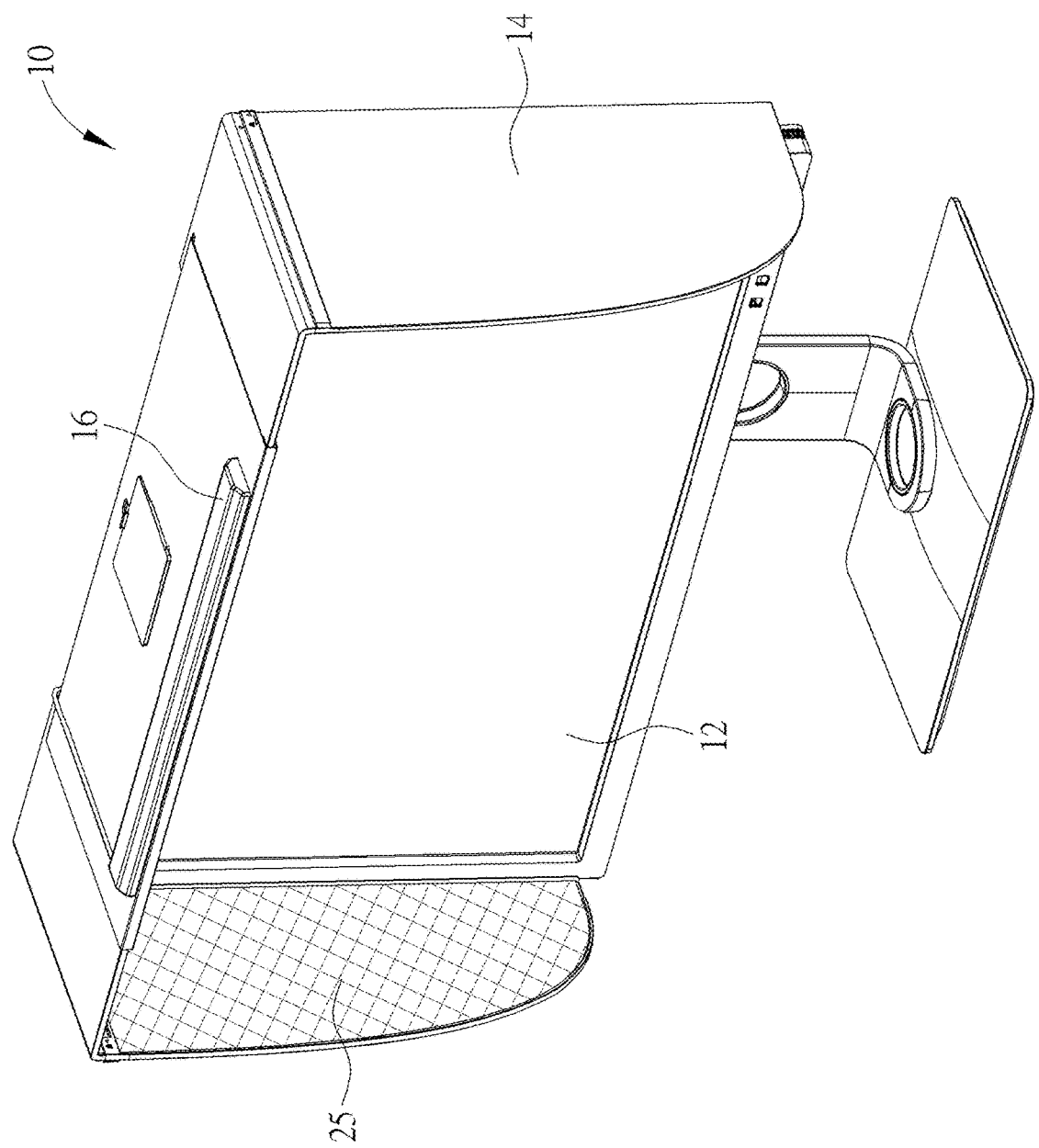
FIG. 1 is an application diagram of a shading apparatus according to a first embodiment of the present invention.
Figure 2:
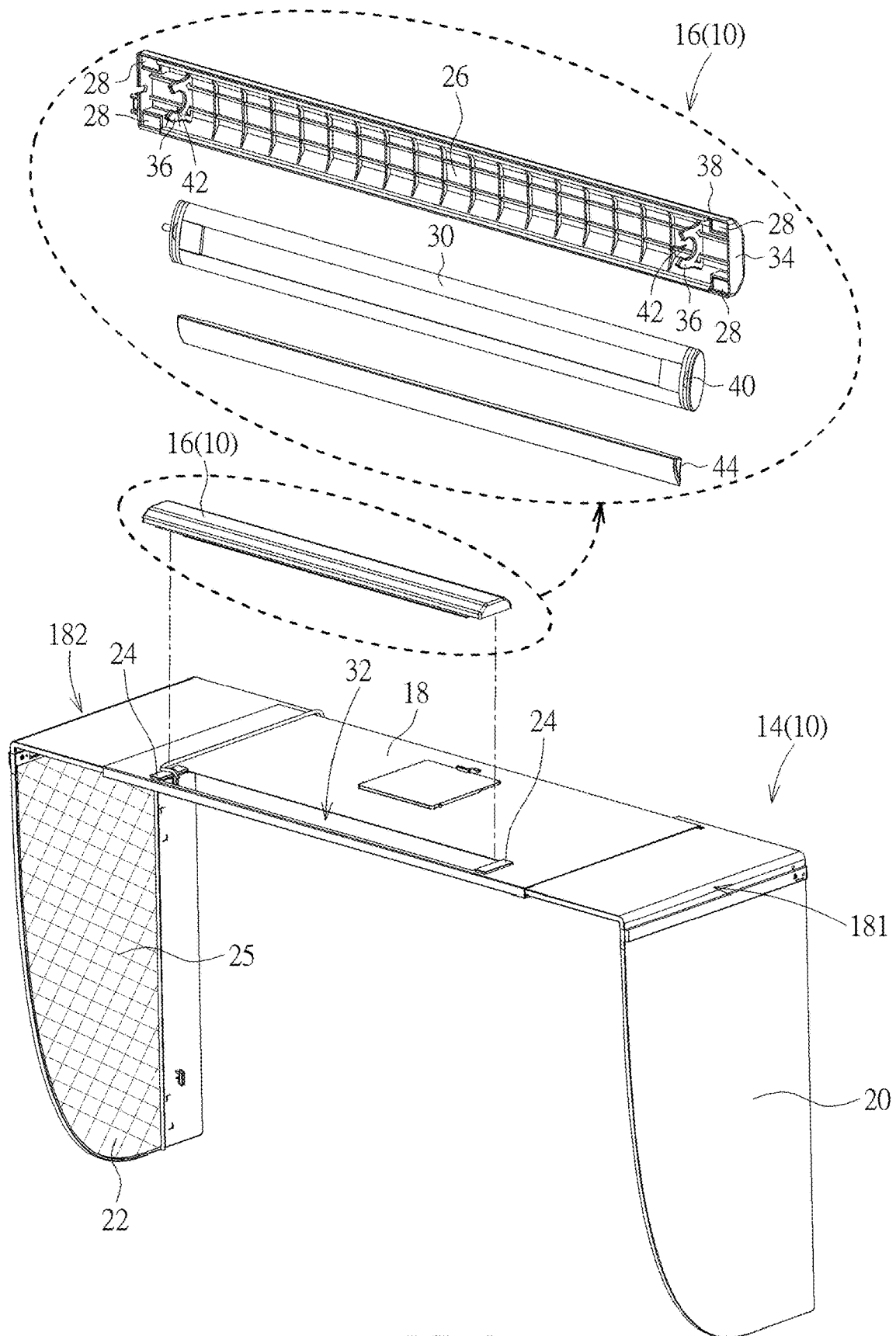
FIG. 2 is an exploded diagram of parts of the shading apparatus according to the first embodiment of the present invention.
Figure 3:
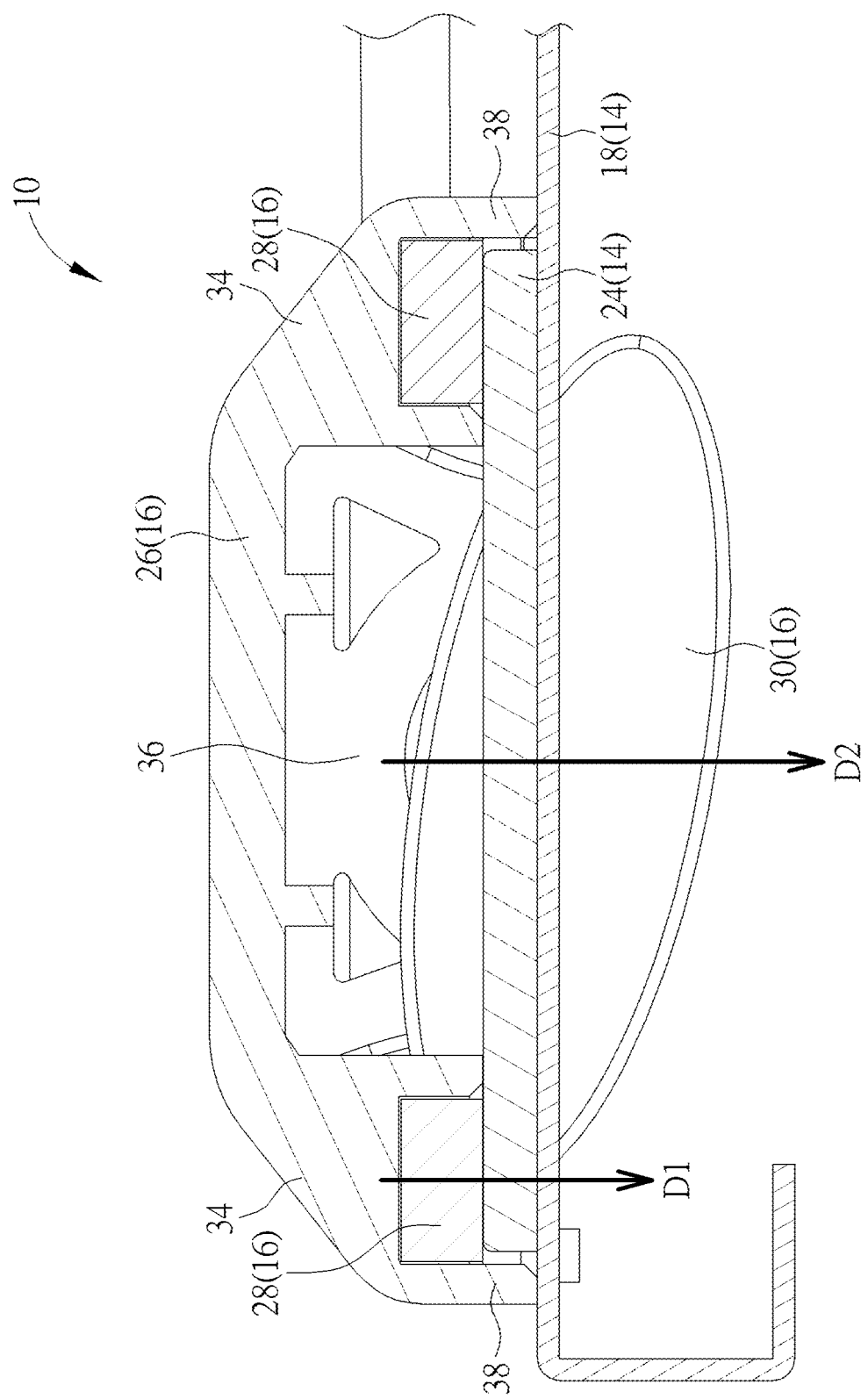
FIG. 3 is a sectional view of parts of the shading apparatus according to the first embodiment of the present invention.
Figure 4:
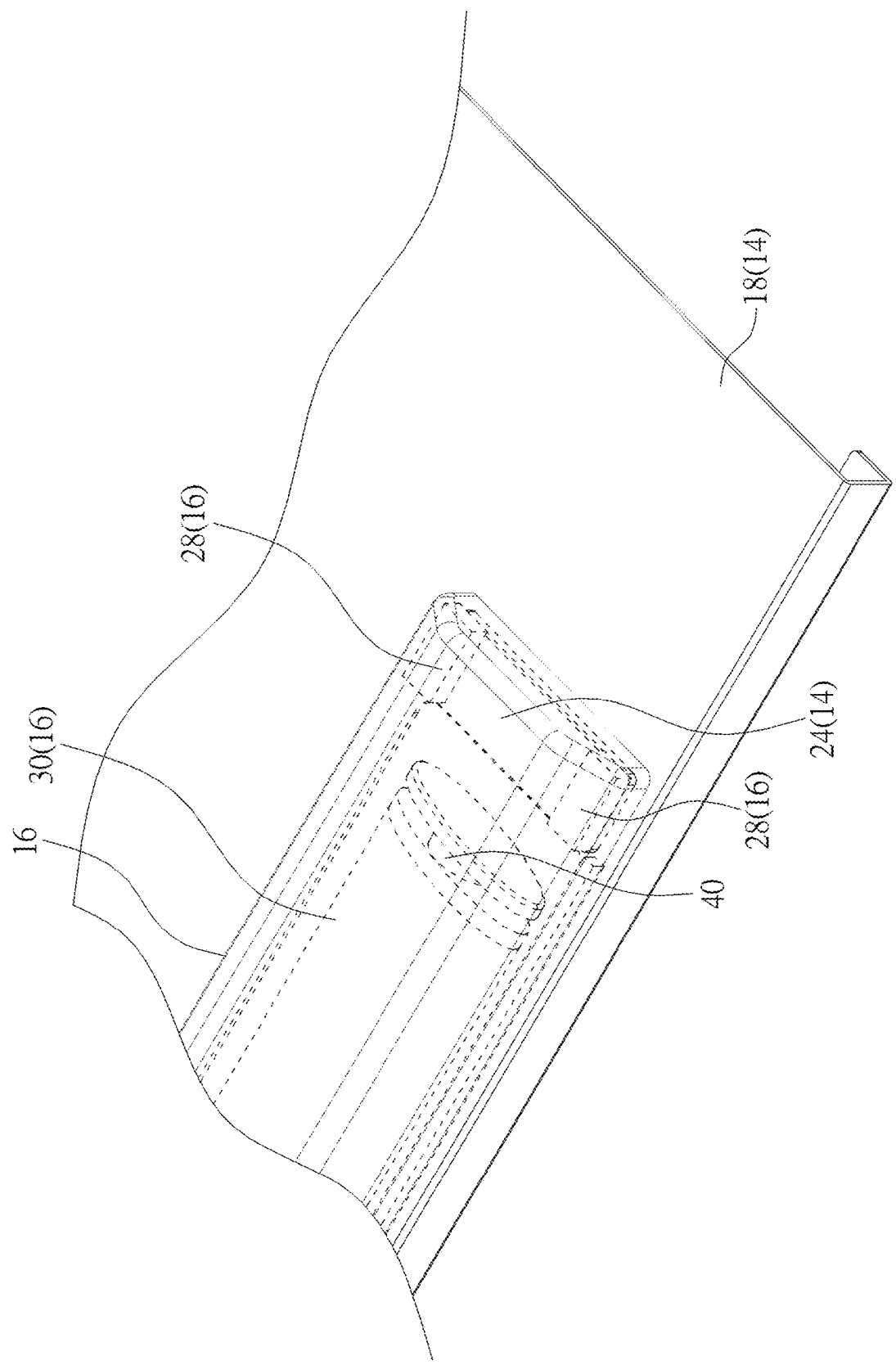
FIG. 4 is a diagram of the shading apparatus in another view according to the first embodiment of the present invention.

Please refer to FIG. 1 to FIG. 4. FIG. 1 is an application diagram of a shading apparatus 10 according to a first embodiment of the present invention. FIG. 2 is an exploded diagram of parts of the shading apparatus 10 according to the first embodiment of the present invention. FIG. 3 is a sectional view of parts of the shading apparatus 10 according to the first embodiment of the present invention. FIG. 4 is a diagram of the shading apparatus 10 in another view according to the first embodiment of the present invention. The shading apparatus 10 can have an illumination function and be applied to a display panel 12. When the user does not observe a target object, the illumination function of the shading apparatus 10 can be turned off, and only the shading apparatus 10 is used to block ambient light around the display panel 12; when the user observes the target object, the illumination function of the shading apparatus 10 can be turned on, without turning on an external illumination apparatus and/or removing the shading apparatus 10, so the shading apparatus 10 can have preferred usage efficiency and convenience.

The shading apparatus 10 can include a shelter 14 and a color assessment light module 16. The shelter 14 can be disposed on the display panel 12 in a detachable manner. The color assessment light module 16 can be disposed on the shelter 14. The shelter 14 can include a top member 18, a first lateral member 20, a second lateral member 22 and a first assembling component 24. The top member 18 can be disposed on an upper side of the display panel 12, and have a first side 181 and a second side 182 opposite to each other. The first lateral member 20 and the second lateral member 22 can be respectively disposed on the first side 181 and the second side 182 of the top member 18, and position of the second lateral member 22 can be opposite to position of the first lateral member 20. The first assembling component 24 can be disposed on the top member 18. The shelter 14 can optionally include a light absorption component 25 (such as a plaid pattern shown in FIG. 1), which can be disposed on inner surfaces of the top member 18 and the first lateral member 20 and the second lateral member 22 in a coating or pasting manner.

In the first embodiment, the shelter 14 can be a U-type structure formed by the top member 18, the first lateral member 20 and the second lateral member 22; an actual application of the shelter 14 is not limited to the foresaid embodiment. For example, the top member 18 and the first lateral member 20 and the second lateral member 22 can be flat plate structures, and sides of the first lateral member 20 and the second lateral member 22 can be respectively connected with two opposite sides of the top member 18, as shown in FIG. 1 and FIG. 2. Or, the top member 18 can be a flat plate structure, and the first lateral member 20 and the second lateral member 22 can be L-type plate structures, and short sides of the first lateral member 20 and the second lateral member 22 (which means the L-type plate structures) can be respectively connected with two opposite sides of the top member 18 to form the shelter 14; the embodiment is not shown in the figures. A type of the shelter 14 is not limited to the foresaid embodiments, which depends on a design demand, and a detailed description is omitted herein for simplicity.

The color assessment light module 16 can include a supporting component 26, a second assembling component 28 and an illumination holder 30. In the first embodiment, the color assessment light module 16 can be disposed outside the shelter 14, and the top member 18 of the shelter 14 can have a hole region 32. The color assessment light module 16 can be disposed on an outer surface of the top member 18, and used to cover the hole region 32 so that the illumination holder 30 can be inserted into or pass through hole region 32. The supporting component 26 can have an accommodating portion 34, a connecting portion 36 and a positioning portion 38. The accommodating portion 34 can be a part of a main body of the supporting component 26. The second assembling component 28 can be disposed inside a notch of the accommodating portion 34. The positioning portion 38 can be outwardly extended from the accommodating portion 34, and used to abut against the top member 18 of the shelter 14, and be engaged by a lateral side of the first assembling component 24. The connecting portion 36 can be disposed adjacent to the accommodating portion 34 and used for connection of the illumination holder 30.

The first assembling component 24 can be disposed on an outer edge of the hole region 32, and a coverage area of the supporting component 26 can be greater than or equal to a total area of the hole region 32 and the first assembling component 24, so that the shading apparatus 10 can have preferred appearance design. In the first embodiment, the supporting component 26 and the second assembling component 28 can be located on the outer surface of the top member 18, and a rotation shaft 40 of the illumination holder 30 can be rotatably disposed on a penetrating hole structure 42 of the connecting portion 36. A lighting unit of the illumination holder 30 can pass through the hole region 32 and be protruded from the inner surface of the top member 18. It should be mentioned that the illumination holder 30 can be disposed on the connecting portion 36 in a tight fit manner, and used to constrain a rotation angle of the illumination holder 30 relative to the supporting component 26. The user can adjust the rotation angle of the illumination holder 30 at will, so as to prevent an illumination beam of the illumination holder 30 from being directly projected onto the display panel 12.

The second assembling component 28 can be assembled with the first assembling component 24 in a detachable manner. For example, the first assembling component 24 and the second assembling component 28 can be two magnetic components with magnetic adsorption properties (such as the embodiment shown in FIG. 3 and FIG. 4), or can be two engaging components that are engaged with each other (which are not shown in the figures). In addition, an opening direction D1 (which can be shown in FIG. 3) of the accommodating portion 34 can be the same as an opening direction D2 of the connecting portion 36; when the second assembling component 28 inside the accommodating portion 34 is attached to the first assembling component 24 on the top member 18, the illumination holder 30 inside the connecting portion 36 can be directly inserted into or pass through the hole region 32 of the top member 18. Moreover, the color assessment light module 16 can optionally include a shading strip 44, which can be disposed on the edge of the supporting component 26 and used to prevent light leakage between the supporting component 26 and the hole region 32.

Figure 5:
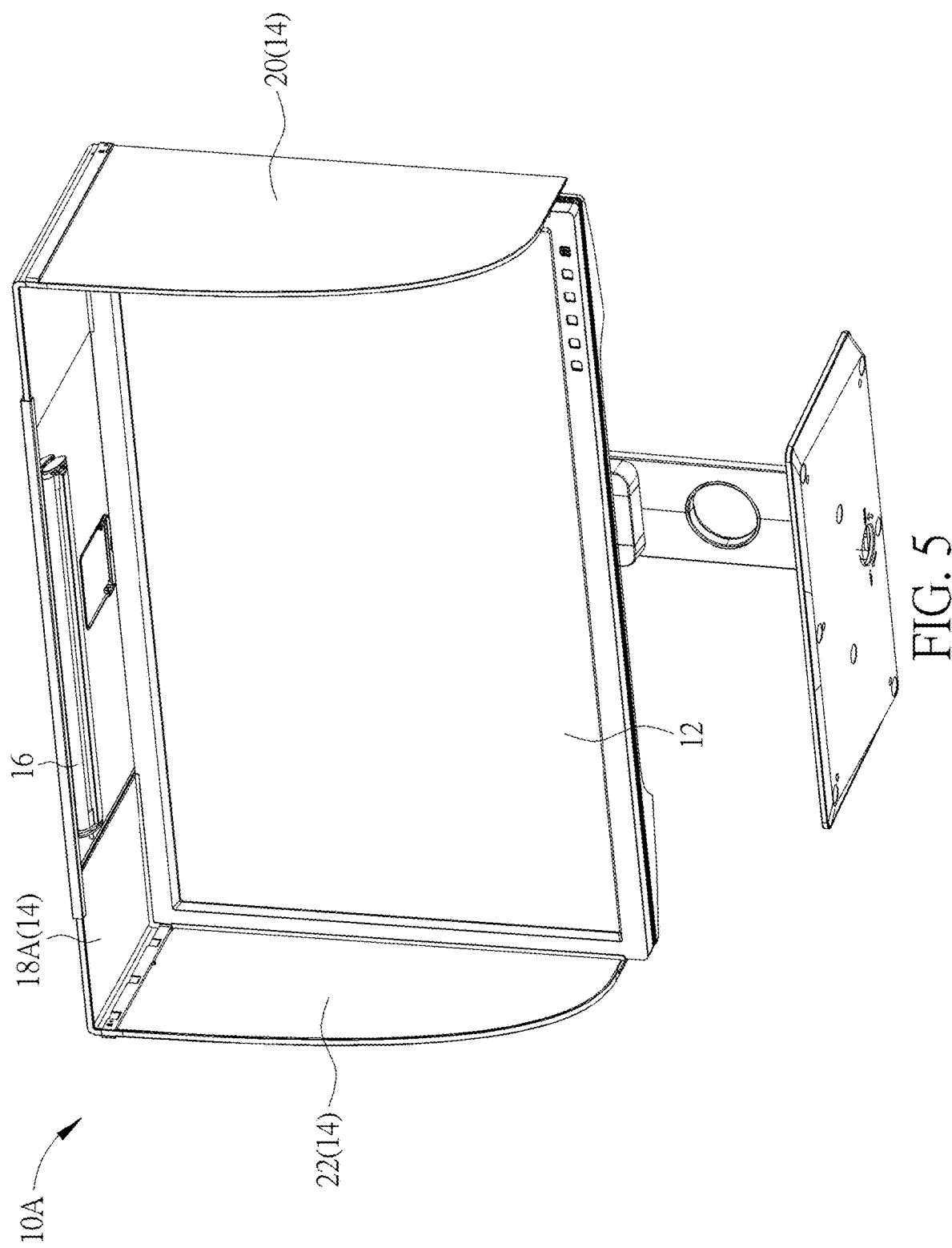
FIG. 5 is an application diagram of the shading apparatus according to a second embodiment of the present invention.
Figure 6:
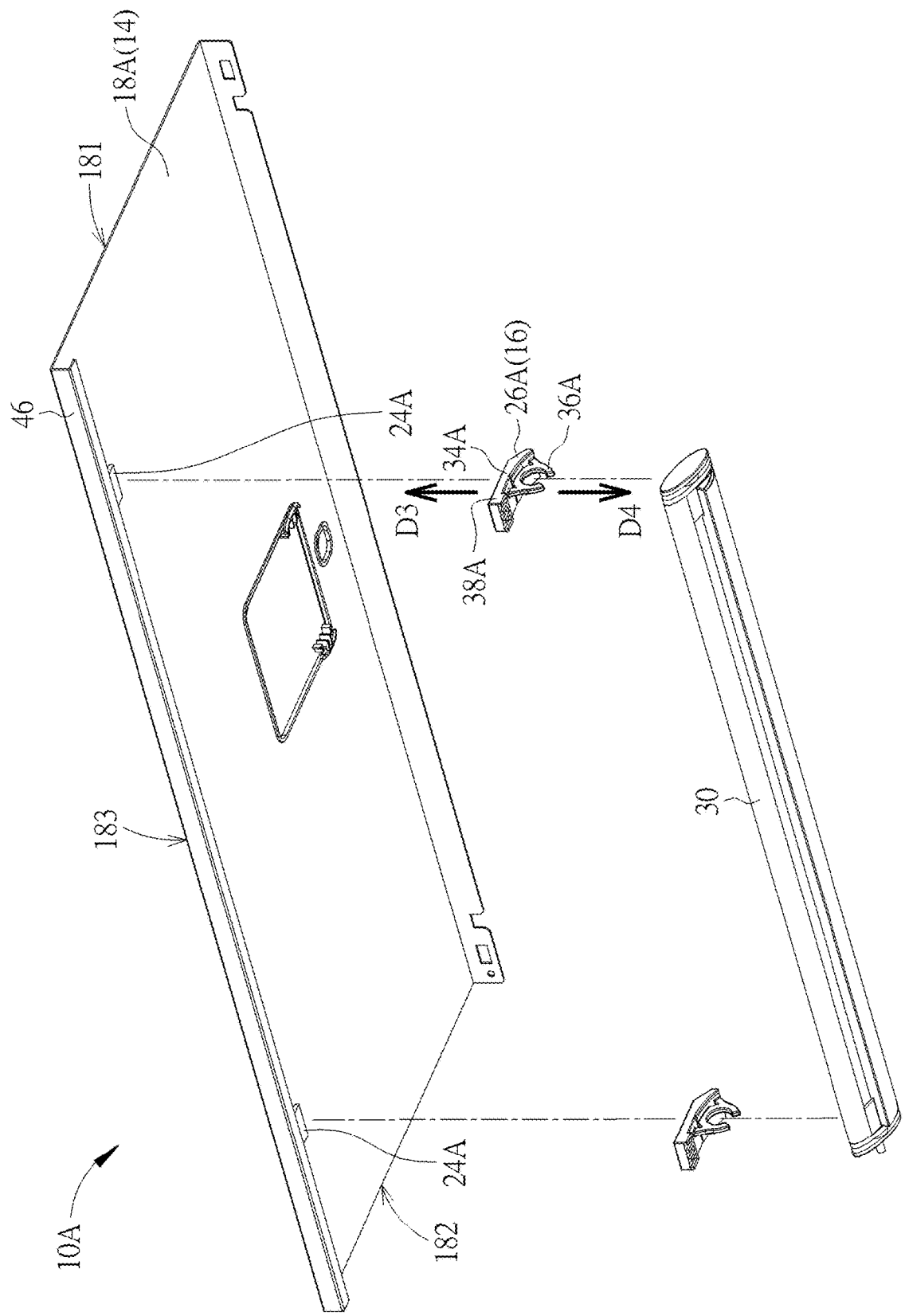
FIG. 6 is an exploded diagram of the shading apparatus according to the second embodiment of the present invention.
Figure 7:
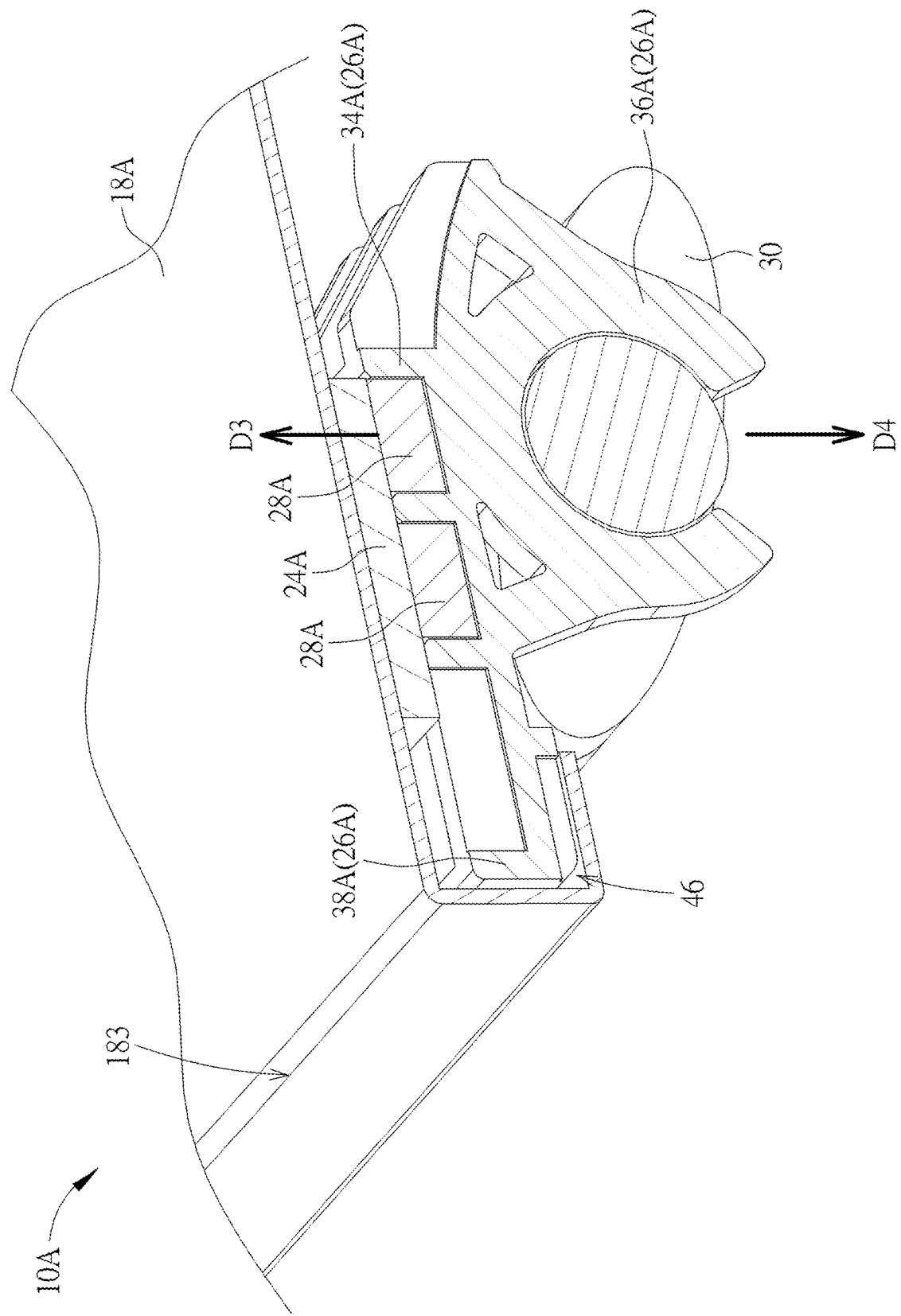
FIG. 7 is a diagram of the shading apparatus in another view according to the second embodiment of the present invention.

Please refer to FIG. 5 to FIG. 7. FIG. 5 is an application diagram of the shading apparatus 10A according to a second embodiment of the present invention. FIG. 6 is an exploded diagram of the shading apparatus 10A according to the second embodiment of the present invention. FIG. 7 is a diagram of the shading apparatus 10A in another view according to the second embodiment of the present invention. In the second embodiment, elements having the same numerals as ones of the first embodiment can have the same structures and functions, and the detailed description is omitted herein for simplicity. The top member 18A of the shelter 14 of the shading apparatus 10A can be a plate structure without holes, and the first assembling component 24A can be disposed on the inner surface of the top member 18A, as shown in FIG. 6. Besides, the color assessment light module 16 of the shading apparatus 10A can optionally include two supporting components 26A respectively disposed on two ends of the illumination holder 30; or, the color assessment light module 16 may dispose one supporting component 26A on an end of the illumination holder 30, and the rotation shaft (which is not marked in the figures) on the other end of the illumination holder 30 can be connected to a corresponding structure (which is not shown in the figures) of the top member 18A. A number and position of the supporting component 26A are not limited to the foresaid embodiment, and depend on the design demand.

As shown in FIG. 6 and FIG. 7, an opening direction D3 of the accommodating portion 34A of the supporting component 26A can be opposite to an opening direction D4 of the connecting portion 36A of the supporting component 26A. Because the color assessment light module 16 is disposed inside the shelter 14, the opening direction D3 of the accommodating portion 34A can be preferably pointed to the top, and the second assembling component 28A located inside the accommodating portion 34A can be directly attached to the first assembling component 24A located inside the top member 18A; the opening direction D4 of the connecting portion 36A can be preferably pointed to the bottom, so the illumination holder 30 located inside the connecting portion 36A can provide the illumination beam for the user who operates the shading apparatus 10A. In other possible situation, the connecting portion 36A can be optionally designed as a C-type structure (or the penetrating hole structure 42 illustrated in the first embodiment), and the rotation shaft 40 of the illumination holder 30 can be disposed inside the C-type structure of the connecting portion 36A in the rotatable manner.

The top member 18A in the second embodiment can optionally include a sunken structure 46 disposed on a third side 183 of the top member 18A; the third side 183 can be located between the first side 181 and the second side 182. The positioning portion 38A of the supporting component 26A can be outwardly extended from the lateral side of the accommodating portion 34A, and used to insert into the sunken structure 46 so that the supporting component 26A can be accurately positioned on the top member 18A. That is to say, the color assessment light module 16 in the second embodiment can be disposed on the shelter 14 via assembly of the second assembling component 28A and the first assembling component 24A and connection of the positioning portion 38A and the sunken structure 46.

In conclusion, the shading apparatus of the present invention can assemble the top member, the first lateral member and the second lateral member together at any angle to form the shelter. The opening (such as the square opening shown in FIG. 1) can be optionally formed on the shelter for accommodating a color calibrator, and the hole region may be formed on the top member in accordance with arrangement of the color assessment light module. The color assessment light module can be disposed outside the shelter, and the illumination holder can be inserted into the shelter through the hole region of the top member; or, the color assessment light module may be directly disposed inside the shelter. Therefore, the present invention can assemble the shelter with the color assessment light module to form the shading apparatus, which can save a lot of placement space; the color assessment light module can be disposed outside or inside the shelter without affecting the appearance and function of the shading apparatus. When there is no color matching operation to be performed, the color assessment light module can be turned off, and the ambient light can be effectively blocked by the shelter; when the color matching operation is required, the brightness inside the shelter is insufficient, and the user can just turn on the color assessment light module of the shading apparatus, instead of leaving the display panel to turn on the external illumination apparatus or removing the shading apparatus, and can check color of the target object or read the document within the range of the shelter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shading apparatus with an illumination function applied to a display panel, the shading apparatus comprising:
   a shelter disposed on the display panel and comprising:
      a top member disposed on an upper side of the display panel, and having a first side and a second side opposite to each other;
      a first lateral member disposed on the first side;
      a second lateral member disposed on the second side and opposite to the first lateral member; and
      a first assembling component disposed on the top member; and
   a color assessment light module disposed on the shelter and comprising:
      a supporting component comprising an accommodating portion, a connecting portion and a positioning portion, the positioning portion being extended from the accommodating portion outwardly to position on the top member;
      a second assembling component disposed on the accommodating portion and detachably assembled with the first assembling component; and
      an illumination holder rotatably disposed on the connecting portion.

2. The shading apparatus of claim 1, wherein the first assembling component is disposed on an inner surface of the top member.

3. The shading apparatus of claim 1, wherein an opening direction of the accommodating portion is opposite to an opening direction of the connecting portion.

4. The shading apparatus of claim 1, wherein the connecting portion has a C-type structure, and a rotation shaft of the illumination holder is rotatably attached to the C-type structure.

5. The shading apparatus of claim 1, wherein the top member further has a third side located between the first side and the second side, a sunken structure is formed on the third side, and the positioning portion is inserted into the sunken structure.

6. The shading apparatus of claim 1, wherein the first assembling component and the second assembling component are two magnetic components with magnetic adsorption properties, or are two engaging components that are engaged with each other.

7. The shading apparatus of claim 1, wherein the illumination holder is disposed on the connecting portion in a tight fit manner, and adapted to constrain a rotation angle of the illumination holder relative to the connecting portion.

8. The shading apparatus of claim 1, wherein the top member further has an hole region, the color assessment light module is disposed on an outer surface of the top member and adapted to cover the hole region.

9. The shading apparatus of claim 8, wherein the first assembling component is disposed on an outer edge of the hole region, and a coverage area of the supporting component is greater than or equal to a total area of the hole region and the first assembling component.

10. The shading apparatus of claim 8, wherein the supporting component and the second assembling component are located on the outer surface, the illumination holder passes through the hole region and is protruded from an inner surface of the top member.

11. The shading apparatus of claim 1, wherein an opening direction of the accommodating portion is the same as an opening direction of the connecting portion.

12. The shading apparatus of claim 1, wherein the connecting portion has a penetrating hole structure, a rotation shaft of the illumination holder is rotatably disposed on the penetrating hole structure.

13. The shading apparatus of claim 1, wherein the positioning portion abuts against the top member and is engaged by a lateral side of the first assembling component.

14. The shading apparatus of claim 8, wherein the color assessment light module further comprises a shading strip disposed on an edge of the supporting component, and adapted to prevent light leakage between the supporting component and the hole region.

15. The shading apparatus of claim 1, wherein the shelter further comprises a light absorption component disposed on inner surfaces of the top member and the first lateral member and the second lateral member.

* * * * *